United States Patent Office 2,926,624
Patented Mar. 1, 1960

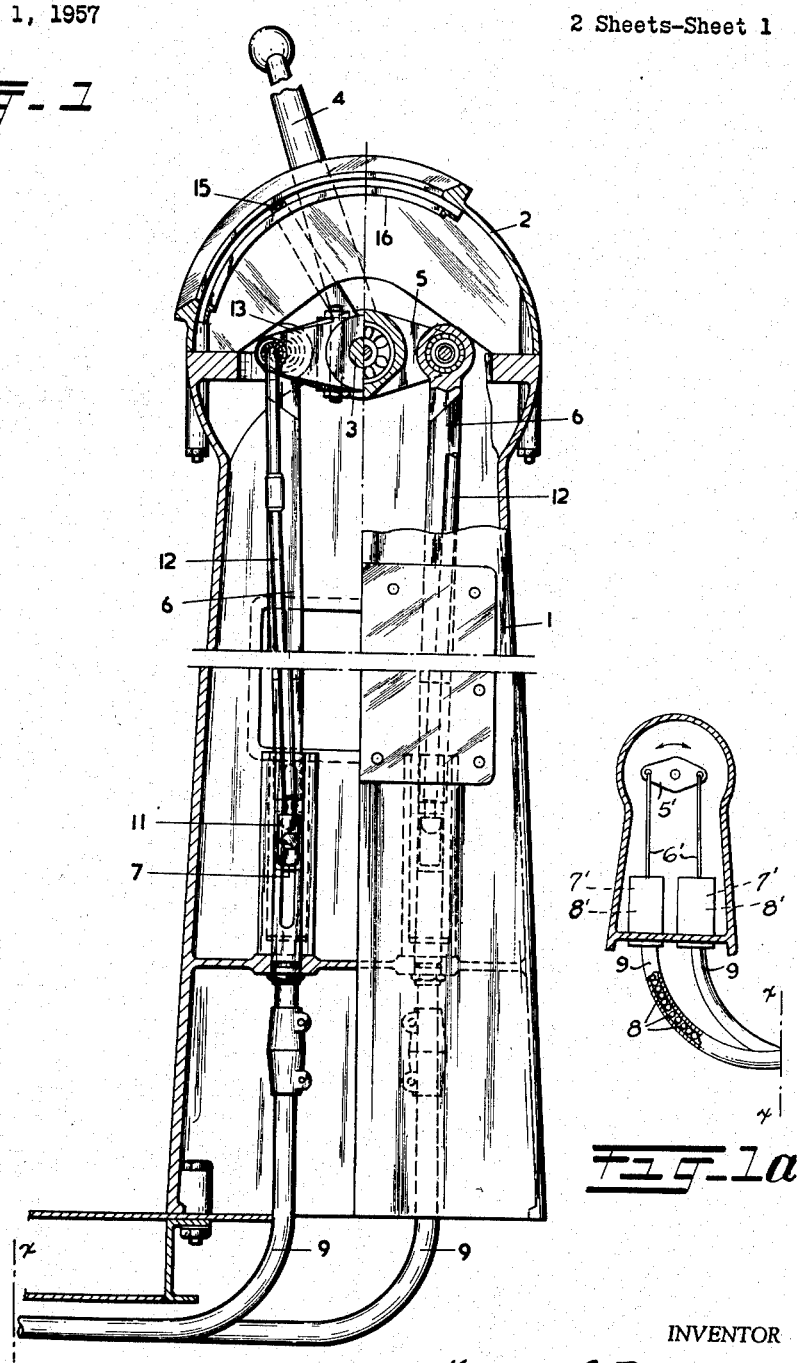

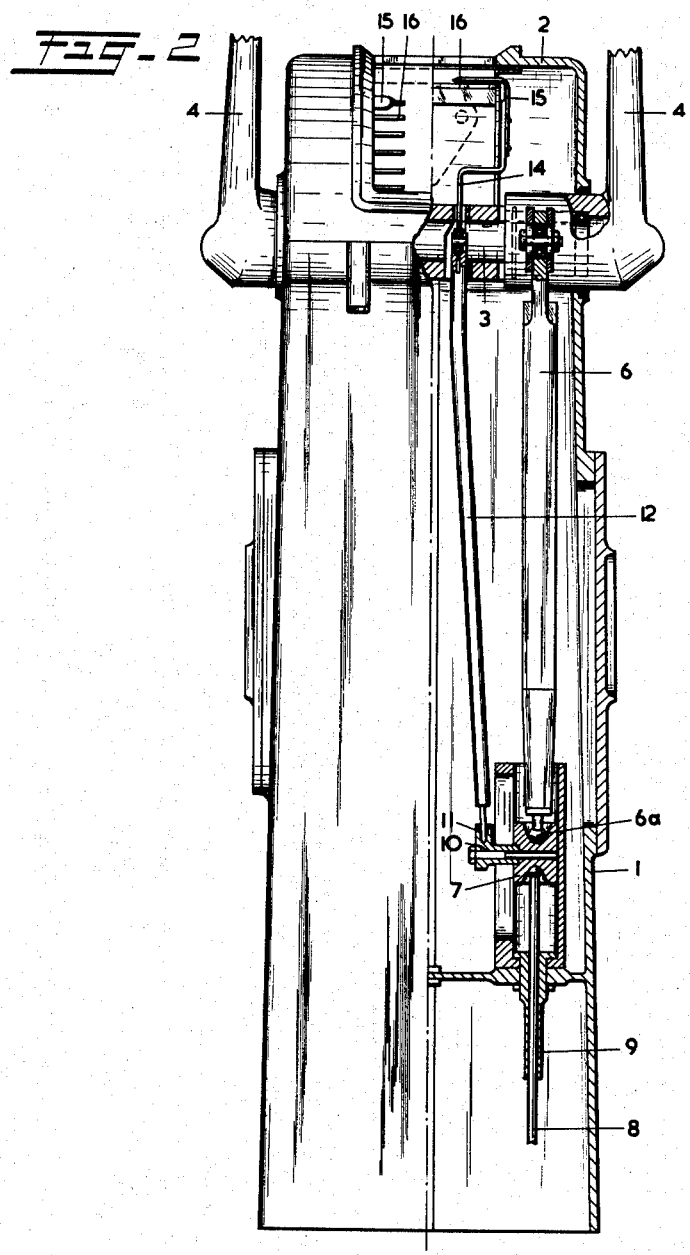

2,926,624

MECHANISM FOR THE REMOTE TRANSMISSION OF MOVEMENT

Marius Cornelis Pieterse, Voorschoten, Netherlands

Application May 1, 1957, Serial No. 656,307

5 Claims. (Cl. 116—21)

The invention relates to a mechanism for the remote transmission of movement, the transmitter being connected to the receiver by means of a closed system of fixed guide tubes having a series of pushing members therein only transmitting pushing forces and movable in the tubes, said tubes constituting two ducts, in such a way that the transmitter is adapted to transmit at will an impulse to the receiver via one duct or the other, while by pushing and displacement under pressure of the pushing members in one of the ducts the pushing members in the other duct are displaced in the opposite direction, i.e. from receiver to transmitter.

A mechanism of this kind is known from the British patent specification No. 522,863 and from the U.S. patent specification No. 2,384,742.

The invention has for its object to furnish for such a mechanism an indicator device which indicates the transmitted movement as accurately as possible in a place near the transmitter. To this end a mechanism as referred to in the preamble is characterized by the fact that an indicator device for indicating the movement in the receiver is located near the transmitter, which device is connected to the pushing members in both ducts by a connection which capable of taking up a force in only one direction, in such a way that indicator device reacts only to the movement of the pushing members in the duct other than that in which an impulse is transmitted from transmitter to receiver. By this means the result is achieved that the indicator device indicates the movement which has actually taken place in the receiver and which may deviate slightly from the adjustment that has been given to the control member of the transmitter. In fact, the force to be transmitted could cause flexible deformations in the duct transmitting the impulse, while the pushing members in the other duct are displaced in the opposite direction without being subjected to any appreciable pressure. The derivation of the indication of the movement from the pushing members in the transmission duct not subjected to considerable forces thus gives a practically faultless indication of the displacement brought about in the receiver. Even a certain amount of play in the system will lead to minimum errors in the indication in the device according to the invention.

It is to be noted that from the British patent specification No. 230,591 a mechanical remote-control device is known in which in the neighbhourhood of the transmitter is located an indicator device which, independently of the system by means of which the motion is transmitted from the control member of the transmitter to the receiver, indicates the position of the controlled member of the receiver. However, in this case the indicator device is connected with the receiver by means of a separate second transmission mechanism, which constitutes a complication.

A mechanism according to the invention is preferably also characterized by the fact that the indicator device comprises a rotatable yoke equipped with a pointer, with the same axis of rotation as the rotatable operating member of the transmitter, said yoke with pointer being adapted to move independently of said operating member and being pivotally connected at either end to a rod which at the other end is only able to take up pushing forces from the pushing members of any duct.

It is advisable, when this preferred feature is employed, to have the yoke connected with the pointer engage with some friction about the stationary shaft of rotation thereof and of the rotatable operating member of the transmitter.

The invention will now be explained more fully with reference to the drawing, in which Fig. 1 is a side elevation and partial vertical cross-section through a transmitter with adjacent parts of the transmission lines, forming part of a mechanism according to a preferred embodiment of the invention.

Fig. 1a is a more or less diagrammatic view of a receiving station the ducts 9 of which connect with the ducts 9 of Fig. 1, as indicated at the line x—x.

Fig. 2 is a front elevation and partial vertical cross-section through the same parts as in Fig. 1, in a plane at right angles to that of Fig. 1.

The transmitter is accommodated in a column 1 with a detachable cover 2. Located at the boundary plane between column and cover is a horizontal shaft 3, which is stationary. At either end of the column a hand lever 4 is supported in bearings about this shaft. Each of these hand levers is rigidly connected with a yoke 5, about the ends of which push rods 6 are adapted to pivot. These push rods act via sliding blocks 7 (operating in guide elements as shown) on pushing members 8, movably arranged in fixed guide tubes or ducts 9. These ducts, four in number, lead to two receivers in all, are mounted stationarily, and are filled with pushing members in the form of mutually abutting elements displaceable longitudinally in each duct, such as the members 8, which may consist of rod-shaped bodies in the straight parts of the duct and of balls or rollers in the bends of the ducts.

Each lever 4 operates a separate yoke 5 and, via push rods connected to each of these yokes, two of the four separate ducts 9.

The blocks 7 have projecting parts 10, each having a part 11 with the shape of a deep cup which is closed at the bottom and towards the top is preferably conically widened inside. Into each of the cup-like parts a push rod 12 for the indicator device engages. Each of these push rods 12 is pivotally connected to one end of a yoke 13, in such a way that each of the two push rods 12 of the two corresponding ducts 9 leading to the same receiver individually engages one of the two ends of the same yoke 13. This yoke 13 is preferably adapted to rotate with some friction about the fixed shaft 3. Rigidly connected to this yoke via an arm 14 is a pointer 15, which passes along an indicating scale 16.

Each hand lever 4 serves to give an adjustment to a separate receiver, and the transmitter is therefore of double construction.

The receiver may be of any known or desired construction, for example, it may be of the type shown in my copending U.S. application Ser. No. 455,648 filed Sept. 13, 1954 now U.S. Patent 2,869,377, or it may be a substantial duplicate of the transmitting mechanism herein shown with its yoke shaft connected to the element to be moved, just as the receiver in my said copending application may be a substantial duplicate of the transmitter shown therein.

Merely for purposes of illustration, and without limiting the invention thereto, a typical operated means is shown in Fig. 1a, comprising elements 8', 7', 6', 5' which may be substantial duplicates of elements 8, 7, 6 and 5 of Fig. 1, and which are coupled to the series of pushing elements in the ducts 9, as above described, so that when the operated means is pushed by the elements in a first of the ducts 9, it imparts pushing motion to the series of elements in the second duct 9.

When an adjustment is made by rotating one of the hand levers 4 about the shaft 3 so that the rod 6 at one end of the corresponding yoke 5 is forced down, the corresponding block 7 and the corresponding pushing member 8 will also move down, as a result of which the pushing members are displaced in a first corresponding duct 9 from transmitter to receiver and the adjustment is received in the receiver. In the receiver the pushing member 8' will move upwardly; the corresponding block 7' and the corresponding rod 6' connecting an end of the corresponding yoke 5' are also forced upwardly. Since the system is a closed one, the pushing members in the corresponding second or other duct 9 from receiver to transmitter will also be displaced under the influence of the displacement of the operated means or yoke 5' together with the downward movement of the rod 6' at the other end of the corresponding yoke 5', the corresponding block 7' and the corresponding pushing member 8' in the receiver, in the opposite direction, so that the pushing members in question cause the respective block 7 in said other duct to move upwards.

The push rod 6, which transmits the movement from the transmitter, fits with its spherical head 6a into a recess of the block 7, in such a way that this head will be disengaged from said block if the pushing members at the transmitter end of the return line do not follow the transmitted adjustment completely. To achieve this, the recess for the spherical head 6a of each rod 6 in the block 7 is so shaped that when some clearance arises between said head 6a and the bottom of the recess in the block 7, said head 6a will still be contained in and guided by the block 7. Because each rod 12 of the indicator device can only take up push and no tension from the block 7 via the bottom of the recess in the corresponding cup-shaped part 11, on the side where a movement is transmitted from the transmitter to the receiver the block 7 will not take the respective rod 12 downwards along with it. Owing to the friction between the respective yoke 13 and the shaft 3 said yoke 13 will try to remain stationary during the movement of lever 4. Only movement in the return duct, i.e. that from receiver to transmitter, will cause the block 7 of the return duct to move upwards, and as a result of this the corresponding rod 12 of the indicator device will also be forced upwards by this block 7, in consequence of which the yoke 13 is rotated and the pointer 15 is moved along the scale 16. Thus, in view of the flexibility and play in the system and in connection with the fact that in the return duct the compressive force is small, and consequently the compression and the deformation are also smaller, the indicator device will accurately indicate the adjustment as it has taken place in the receiver. Any breakage of a duct, loosening of a tube coupling or any other defect can thus at once be observed at the transmitter because it will be visible that the pointer 15 does not follow the displacement of the hand lever 4, or not sufficiently so.

What I claim is:

1. The combination, with a mechanism for the transmission of movement, said mechanism comprising a transmitting station and a receiving station, a pair of ducts extending between said stations, a series of mutually abutting elements displaceable longitudinally in each duct, operating means at the transmitting station for selectively imparting pushing motion to either of said series and operated means at the receiving station coupled to each of said series and imparting pushing motion to the other of said series as it is moved by being pushed by either of said series; of motion indicating means at said transmitting station responsive to the motion imparted to the other of said series by said operated means when motion is imparted to either of said series by said operating means; the operating means at the transmitting station comprising a first yoke means rotatable about an axis and comprising means for engaging and selectively pushing either of said series of elements and for withdrawing ahead of the other of said series of elements depending on the direction of rotation of said first yoke means; and the motion indicating means at said transmitting station comprising a second yoke means rotatable about the same axis as said first yoke means, a pointer carried by said second yoke means, said second yoke means and pointer being rotatable about said axis independently of said first yoke means, and push rods pivotally connected to said second yoke means at opposite sides of said axis, said push rods being abuttingly engaged by said series of pushing elements, respectively.

2. A combination according to claim 1, said motion indicating means comprising frictionally engaging means for displaceably retaining said second yoke means in the positions of rotation about said axis to which it is moved by motion of said other series of elements, respectively.

3. The combination, with a mechanism for the transmission of movement, said mechanism comprising a transmitting station and a receiving station, a pair of ducts extending between said stations, a series of mutually abutting elements displaceable longitudinally in each duct, operating means at the transmitting station for selectively imparting pushing motion to either of said series and operated means at the receiving station coupled to each of said series and imparting pushing motion to the other of said series as it is moved by being pushed by either of said series; of motion indicating means at said transmitting station responsive to the motion imparted to the other of said series by said operated means when motion is imparted to either of said series by said operating means; said motion indicating means comprising a pointer, means including a pair of push rods for respectively moving said pointer in opposite directions, cup-like coupling members abuttingly engaged by elements of said series near the transmitting station end of said series of abutting elements, respectively, the ends of said push rods being socketed in and retained against lateral misalignment by said cup-like coupling members.

4. A mechanism for the transmission of movement comprising, in combination, a transmitting station and a receiving station, a pair of ducts extending between said stations, and a series of mutually abutting pushing elements displaceable longitudinally in each duct; operated means at said receiving station abuttingly coupled to the series of elements in each of said ducts and imparting pushing motion to the series of elements in the second of said ducts as it is moved by being pushed by the series of elements in a first of said ducts; operating means at said transmitting station abuttingly coupled to the series of elements in each of said ducts and selectively operable to impart pushing motion to the series of elements in either of said ducts; and motion indicating means at said transmitting station abuttingly coupled to the series of elements in each of said ducts independently of said operating means and responsive to motion imparted to the series of elements in the second of said ducts by said operated means when motion is imparted to the series of elements in a first of said ducts by said operating means.

5. The combination, with a mechanism for the transmission of movement; which mechanism comprises a transmitting station and a receiving station, a pair of ducts extending between said stations, a series of mutually abutting pushing elements displaceable longitudinally in each duct, operating means at the transmitting station abuttingly coupled to the series of elements in each of said ducts and selectively operable to impart pushing motion to the series of elements in either of said ducts, and operated means at the receiving station abuttingly coupled to the series of elements in each of said ducts and imparting pushing motion to the series of elements in the second of said ducts as it is moved by being pushed by the series of elements in a first of said ducts; of motion indicating means at said transmitting station abuttingly coupled to the series of pushing elements in each of said ducts independently of said operating means and responsive to the motion imparted to the series of pushing elements in the second of said ducts by said operated means, when motion is imparted to the series of pushing elements in a first of said ducts by said operating means.

References Cited in the file of this patent

UNITED STATES PATENTS

| | | |
|---|---|---|
| 2,384,742 | Hewett | Sept. 11, 1945 |

FOREIGN PATENTS

| | | |
|---|---|---|
| 91,874 | Germany | of 1897 |
| 524,215 | Great Britain | Aug. 1, 1940 |
| 893,385 | France | Jan. 31, 1944 |
| 489,750 | Canada | Jan. 20, 1953 |